United States Patent [19]

Bundy

[11] 4,113,449

[45] Sep. 12, 1978

[54] BAGHOUSE CLEANING METHOD

[75] Inventor: Richard P. Bundy, Prairie Village, Kans.

[73] Assignee: Standard Havens, Inc., Kansas City, Mo.

[21] Appl. No.: 827,942

[22] Filed: Aug. 26, 1977

[51] Int. Cl.² ............................................. B01D 46/04
[52] U.S. Cl. ......................................... 55/96; 55/288; 55/302
[58] Field of Search .................. 55/96, 286, 287, 288, 55/302, 293

[56] References Cited

U.S. PATENT DOCUMENTS

| 3,073,097 | 1/1963 | Hallet et al. | 55/302 |
| 3,178,868 | 4/1965 | Gibby | 55/96 |
| 3,325,979 | 6/1967 | Smith | 55/302 |
| 3,513,638 | 5/1970 | Young | 55/302 |
| 3,729,903 | 5/1973 | Espeel | 55/302 |

Primary Examiner—Frank W. Lutter
Assistant Examiner—David L. Lacey
Attorney, Agent, or Firm—Lowe, Kokjer, Kircher, Wharton & Bowman

[57] ABSTRACT

Prior to initiating cleaning of the filter assemblies with high pressure air, process gas flow is restricted, as with a flow control valve, to establish a pressure drop across the baghouse in the range ¼ to ½ inches water gauge.

2 Claims, 2 Drawing Figures

BAGHOUSE CLEANING METHOD

BACKGROUND AND SUMMARY OF THE INVENTION

This invention relates to industrial baghouses and, more particularly, to an improved method for cleaning the filter assemblies of baghouses.

Continuous emphasis on environmental quality has resulted in increasingly strenous regulatory controls on industrial emissions. One technique which has proven highly efficient in controlling air pollution has been the separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by one or more tube sheets. Disposed within openings communicating with the plenums are fabric filters. A particle-laden gas stream, induced by the action of a fan, blows into one chamber (dirty air plenum) wherein dust accumulates on the fabric filter as the gas passes through the fabric into the other chamber (clean air plenum) and out the exhaust.

Although all baghouses are designed in accordance with the foregoing general principles, there are numerous operational and structural distinctions. The present invention relates to a baghouse wherein the dirty and clean air plenums are separated by a tube sheet having a plurality of vertically suspended filter bags in which cylindrical wire cages are inserted for skeletal support. Filtration of the process gas occurs from outside to inside of the bags.

During continuous operation of the baghouse the bags must be periodically cleaned to remove the filter cake which accumulates on the fabric. One of two cleaning methods are typically employed in an outside bag collector. In pulsing-plenum cleaning, high pressure air is introduced to a compartment in the clean air plenum and the dust cake is simultaneously dislodged from all filter bags in that compartment. With pulse jet cleaning, on the other hand, the upper end of the cage is typically equipped with a diffuser, venturi or nozzle directed interiorly of the cage and a short blast of high pressure air is individually introduced through each nozzle. This pulse of air travels through the filter sleeve, causing it to flex out from the cage to dislodge the dust cake.

Further details of a baghouse having filter assemblies suspended from a tube sheet and employing pulse jet cleaning may be found in U.S. Pat. No. 3,876,402 by Bundy et al. issued Apr. 8, 1975, and specifically incorporated herein by reference.

It should be noted that either of the two foregoing cleaning methods (i.e. pulsing-plenum or pulse jet cleaning) are normally carried out without interrupting the flow of process gas. In other words, the baghouse continuously filters the particle-laden process gas stream at the same time some of the filter assemblies are being cleaned. The cleaning air is thus at a sufficiently high pressure to overcome the pressure of the process gas and back flush the filters to dislodge any dust cake. Consequently, complete shutdown of the baghouse is only necessary for maintenance and repair such as replacing defective filters.

To meet the needs for on-line maintenance and permit true 24 hour operation, industry developed a modularized baghouse made up of several filter modules filtering in parallel, each individual module itself being a complete baghouse. Since individual modules could be isolated for inspection and maintenance purposes while the majority of the modules were left in service, on-line baghouse maintenance became a reality.

Further details of a modularized baghouse may be found commonly assigned in U.S. Patent Application Ser. No. 765,989 by Bundy et al filed Feb. 7, 1977, and specifically incorporated herein by reference.

As an outgrowth of the development of modularized baghouses came recognition of the benefits which could be achieved by cleaning a isolated module. When cleaning a baghouse or module isolated and out of service, process gas flow is cut off which minimizes re-entrainment of dust particles and results in more efficient cleaning. Furthermore, there is a lower pressure drop to overcome in pulsing and there is far less damage to the bags when returning to their associated cages after flexure.

Contrary to industry practices, however, I have discovered that the foregoing advantages of isolated cleaning can be retained while achieving greater effectiveness and efficiency of cleaning the filter assemblies through incomplete isolation of the baghouse. Incomplete isolation is provided by establishing a pressure drop in the range of $\frac{1}{4}$ to $1\frac{1}{2}$ inches water gauge in opposition to the cleaning air flow.

Accordingly, an object of this invention is to provide an improved baghouse cleaning method to maximize cleaning effectiveness and efficiency of the filter assemblies and at the same time minimize dust re-entrainment and bag damage.

Another object of the invention is to provide a baghouse cleaning method to insure maximum flexure of the filter bags on their associated support cages.

An additional object of the invention is to provide an improved cleaning method of the character disclosed equally suited to baghouses employing either pulsing-plenum or pulse jet cleaning cycles.

A further object of the invention is to provide suitable apparatus for practicing the cleaning method herein disclosed.

Other and further objects of the invention, together with the features of novelty appurtenant thereto will appear in the course of the following description of the drawing.

DESCRIPTION OF THE DRAWING

In the accompanying drawing, which forms a part of the specification and is to be read in conjunction therewith and in which like reference numerals are employed to indicate like parts in the various views.

The improved cleaning method resides in establishing a pressure drop in opposition to the cleaning gas in the operable range of $\frac{1}{4}$ to $1\frac{1}{2}$ inches water gauge and preferably in the range of one-half to three-fourths inch water gauge. Such pressure drop from the dirty air plenum to the clean air plenum can be advantageously accomplished by permitting limited process gas flow through the baghouse, thus yielding so-called "incomplete isolation" of the baghouse. Once the differential pressure in the suitable range is established, back flushing the filter assemblies with compressed air may be initiated.

Figure 1:
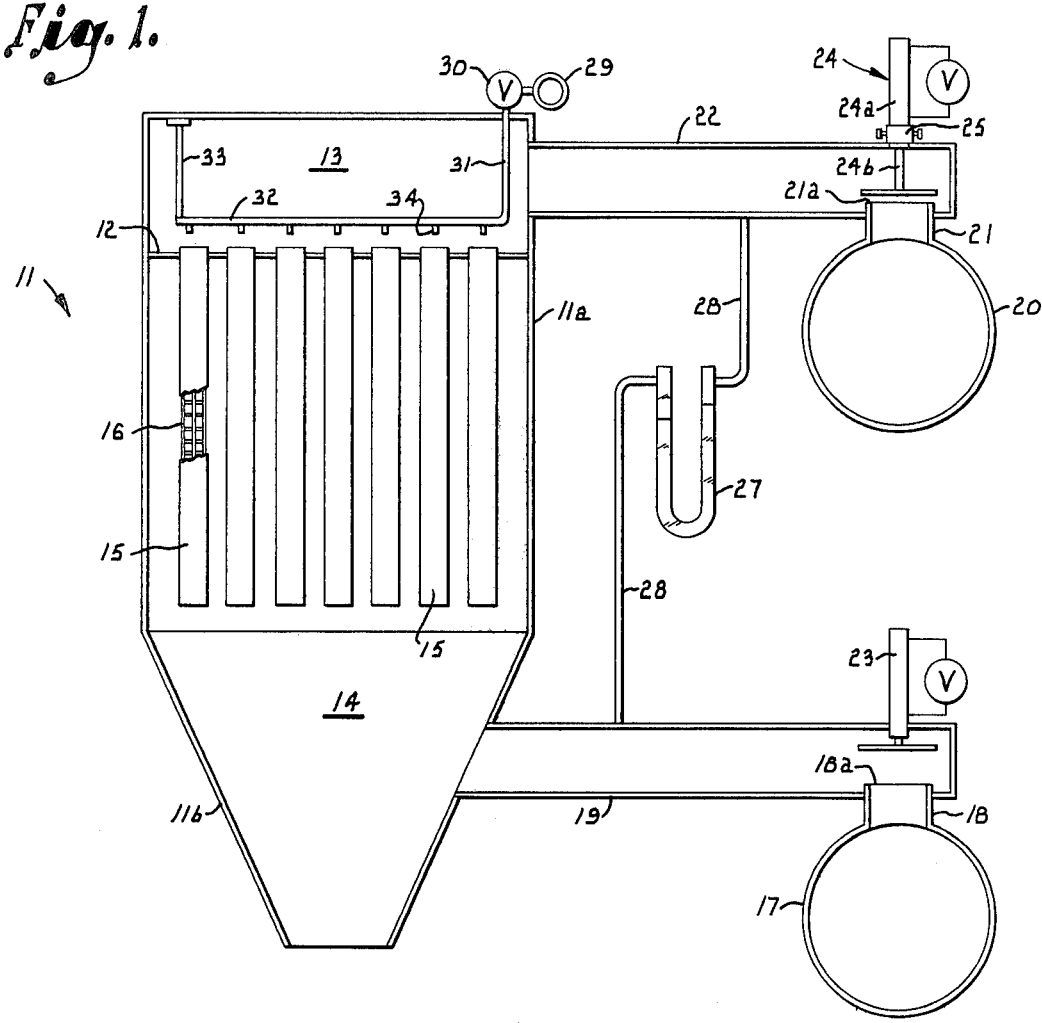
FIG. 1 is a side sectional, partly schematic, view of a baghouse constructed in accordance with a preferred embodiment of the invention to practice the cleaning technique hereof.

Referring to the drawing in greater detail, FIG. 1 illustrates a complete baghouse or a baghouse module, which includes a housing, generally designated by the numeral 11, formed as a rectangular or box-like upper section 11a joined to a hopper shaped lower section 11b. Disposed interiorally of, and sealed against, the housing section 11a is a horizontal tube sheet 12 defining a clean air plenum 13 thereabove and a dirty air plenum 14 therebelow. The tube sheet 12 includes a plurality of circular holes therethrough in which are suspended vertically aligned filter bags 15 fitted over cylindrical cages 16 for skeletal support.

An inlet process gas header 17 is equipped with a fitting 18 connected to the inlet gas duct 19 which, in turn, is connected to the dirty air plenum 14. Similarly, an outlet gas header 20 is equipped with a fitting 21 connected to the outlet duct 22 of the clean air plenum 13. A prime mover fan (not shown) is conventionally connected to the outlet gas header 20 for pulling process gas through the baghouse.

The upper rim of the inlet fitting 18 forms a valve seat 18a which cooperates with a valve 23 mounted on the inlet duct 19 to block gas flow to the dirty air plenum 14. Likewise, the upper rim of the outlet fitting 21 forms a valve seat 21a which cooperates with a valve 24 mounted on the outlet duct 22 to block gas flow from the clean air plenum 13. Thus, the baghouse is on-stream for normal filtering operations by opening both valves 23 and 24 and may be completely isolated for maintenance such as bag replacement by closing both valves 23 and 24. In order to practice the inventive method, however, either valve 23 or valve 24 is made adjustable. For purposes of illustration in the drawing, valve 24 is adjustable.

Figure 2:
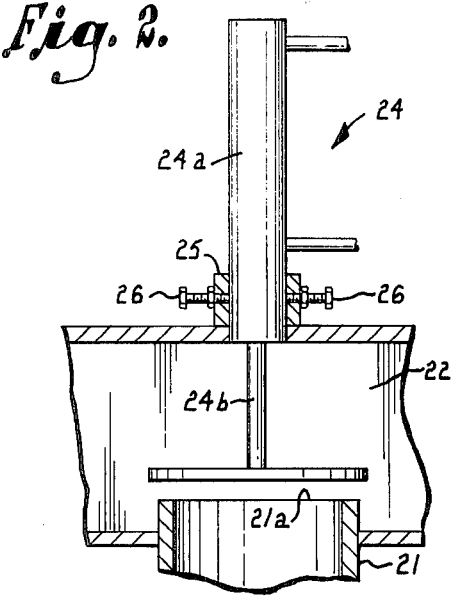
FIG. 2 is an enlarged side view of the flow control valve shown in FIG. 1.

With reference to FIG. 2, a sleeve bearing 25 is attached to the outlet duct 22 and is bored and taped to accommodate set screws or bolts 26. The cylinder 24a of valve 24 is slidably received in bearing 25 and is locked at an appropriate position with set bolts 26. As shown in the drawing, valve 24 is positioned so that when the plunger 24b is fully extended it does not mate with valve seat 21a. Instead, a slight gap is left to permit limited process gas flow to establish the suitable pressure drop from the dirty air plenum 14 to the clean air plenum 13. A manometer 27 may be connected across the inlet duct 19 and outlet duct 22 with static lines 28 to measure the pressure drop and to aid in proper adjustment of the flow control valve.

The improved cleaning method is beneficial to baghouses operating with either pulsing-plenum or pulse jet cleaning cycles. As an example, the baghouse illustrated in the drawing incorporates a pulse jet cleaning system. The cleaning equipment includes a compressed air header 29 which is connected by one or more solenoid valves 30 to a piping network within the clean air plenum 13. The piping network has vertical pipes 31 communicating with the control valves 30 and a plurality of horizontal pipes 32 supportingly suspended from the housing 11, as by brackets 33, above the rows of tubes 15. Each horizontal pipe 32 is positioned above a row of bags 15 and includes a plurality of downwardly directed nozzles 34 centrally aligned with the mouths of the filter bags 15. Further details of pulse jet cleaning apparatus and operation thereof may be found in U.S. Pat. No. 3,876,402 previously incorporated by reference.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a baghouse comprising a housing, a partition disposed within and sealed against said housing defining a first chamber on one side of said partition and a second chamber on the other side thereof, an inlet conduit connected to said housing for directing a process gas stream containing particulate matter into said first chamber, an outlet conduit communicating with said second chamber to exhaust process gas therefrom, a plurality of gas passages through said partition establishing communication between said first and second chambers, and a plurality of filter assemblies associated with said gas passages for removing particulate matter from process gas flowing from said first chamber to second chamber, each said filter assembly comprising a cylindrical fabric sleeve having an open end portion sealingly secured to a gas passage through said partition, an elongate tubular portion and a closed end portion extending into said first chamber, and a cylindrical foraminous cage disposed with said sleeve for skeletal support; a method of cleaning said filter assemblies comprising the steps of:

restricting process gas flow through said housing to establish a pressure drop from said first chamber to said second chamber in the range of ¼ to 1½ inches water gauge; and delivering an intermittent blast of high pressure cleaning gas to said filter assemblies to dislodge particulate matter collected thereon.

2. The method as in claim 1 wherein said first step comprises restricting process gas flow through said housing to establish a pressure drop from said first chamber to said second chamber in the range of one-half to three-fourths inch water gauge.

* * * * *